(12) United States Patent
Ohira et al.

(10) Patent No.: US 8,151,827 B2
(45) Date of Patent: Apr. 10, 2012

(54) METHOD FOR REHABILITATING EXISTING PIPE

(75) Inventors: Akitoshi Ohira, Atlanta, GA (US);
Masato Horiuchi, Atlanta, GA (US);
Hiroshi Sugahara, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 482 days.

(21) Appl. No.: 12/377,262

(22) PCT Filed: Oct. 23, 2007

(86) PCT No.: PCT/JP2007/070622
§ 371 (c)(1),
(2), (4) Date: Feb. 11, 2009

(87) PCT Pub. No.: WO2008/050750
PCT Pub. Date: May 2, 2008

(65) Prior Publication Data
US 2010/0180973 A1     Jul. 22, 2010

(30) Foreign Application Priority Data
Oct. 25, 2006    (JP) ................................ 2006-290215

(51) Int. Cl.
*F16L 55/163*     (2006.01)
(52) U.S. Cl. ....... 138/98; 138/97; 405/184.2; 405/150.1
(58) Field of Classification Search ........... 138/97, 138/98; 405/150.1, 184.2
See application file for complete search history.

(56) References Cited

U.S. PATENT DOCUMENTS

| | | | |
|---|---|---|---|
| 4,995,929 A | | 2/1991 | Menzel |
| 5,101,863 A | * | 4/1992 | Fujii et al. ........................ 138/98 |
| 5,388,929 A | * | 2/1995 | Molyneux .................. 405/184.2 |
| 5,660,912 A | * | 8/1997 | Menzel ........................... 428/99 |
| 5,799,701 A | * | 9/1998 | Kitahashi et al. ................ 138/97 |
| 2004/0013472 A1 | * | 1/2004 | Akimoto et al. ........... 405/184.2 |
| 2008/0205991 A1 | * | 8/2008 | Bateman et al. ........... 405/184.2 |
| 2008/0272110 A1 | * | 11/2008 | Kamiyama et al. ........... 219/535 |

FOREIGN PATENT DOCUMENTS

| | | |
|---|---|---|
| JP | 63-503238 A | 11/1988 |
| JP | 03-048392 B2 | 7/1991 |
| JP | 05-247993 A | 9/1993 |
| JP | 08-075042 A | 3/1996 |
| JP | 2000-254970 A | 9/2000 |
| JP | 2000-301613 A | 10/2000 |

\* cited by examiner

OTHER PUBLICATIONS

International Search Report for the Application No. PCT/JP2007/070622 mailed Jan. 29, 2008.

*Primary Examiner* — James Hook
(74) *Attorney, Agent, or Firm* — Cheng Law Group, PLLC

(57) ABSTRACT

In an existing pipe rehabilitating method according to an embodiment, a profile strip (2) for lining an existing pipe (10) is shaped using a thermoplastic resin, joint portions (21) are provided at both end portions in a width direction of the profile strip, and the profile strip (2) is inserted into the existing pipe (10) and is helically wound in the existing pipe (10). The joint portions (21) of adjacent windings of the profile strip (2) are interlocked with each other, thereby forming a rehabilitating pipe (20). Also, the profile strip (2) of the rehabilitating pipe (20) is deformed by a heating step in which the profile strip (2) is subjected to a heating process so as to conform a shape of a curved portion (13) of the existing pipe (10), thereby integrating the profile strip (2) with an inner peripheral surface of the curved portion (13) of the existing pipe (10).

12 Claims, 15 Drawing Sheets (outer surface of rehabilitating pipe)

(inner surface of rehabilitating pipe)

METHOD FOR REHABILITATING EXISTING PIPE

TECHNICAL FIELD

The present invention relates to an existing pipe rehabilitating method for rehabilitating an aging existing pipe, such as an agricultural water pipe, sewage and storm water pipes, a water supply pipe, a gas pipe or the like, by forming a lining pipe on an inner surface of the existing pipe.

BACKGROUND ART

Existing pipes that are used as water supply and sewage pipes, gas pipes or the like are conventionally metal pipes and Hume pipes. Such existing pipes are aging over a long-period use, so that water leakage is likely to occur due to a crack or corrosion. Therefore, in recent years, a synthetic resin pipe is inserted into an aging existing pipe, such as a buried pipe or the like, so as to provide a lining.

For example, as described in Patent Document 1, there is a known existing pipe lining technique of lining an existing pipe with a helical pipe that is formed by helically winding a profile strip made of a synthetic resin. In this technique, a profile strip for lining an existing pipe is helically wound. When the profile strip is helically wound, adjacent edge portions of the profile strip overlap and interlock with each other, so that a rehabilitating pipe is produced. The helical pipe is produced within the existing pipe and is fixed to an inner peripheral surface of the existing pipe, thereby lining the aging existing pipe.

In the case of the profile strip for lining an existing pipe, when the rehabilitating pipe is inserted and passed into, for example, a curved existing pipe, the inner peripheral surface of the existing pipe contacts the rehabilitating pipe, so that large resistive force acts on the rehabilitating pipe. Therefore, when the profile strip is progressively passed and fed into the existing pipe, pushing force acts on the profile strip in a helical direction, i.e., force is applied to the rehabilitating pipe so that the diameter is expanded. Thereby, large tensile force acts in a width direction of the profile strip, so that the tensile force is likely to release the overlapping edge portions of the profile strip, so that the rehabilitating pipe is damaged.

Particularly, if sewage and storm water pipes into which a rehabilitating pipe is to be inserted is curved, then when the rehabilitating pipe reaches the curved portion of the sewage and storm water pipes, the outer peripheral surface at the tip portion of the rehabilitating pipe contacts the inner peripheral surface of the sewage and storm water pipes, so that large resistive force is applied on the rehabilitating pipe. Then, when the rehabilitating pipe is curved along the sewage and storm water pipes, tensile force acts on the profile strip of the rehabilitating pipe in its width direction.

To solve such a problem, Patent Document 2 proposes a technique in which windings of a profile strip are joined by a joiner that is capable of expanding and contracting.

Patent Document 1: JP H03-48392 B
Patent Document 2: JP H08-75042 A

DISCLOSURE OF INVENTION

Problem to be Solved by the Invention

The above-described conventional rehabilitating pipes are effective when the curvature of a curved portion of an existing pipe is not large. However, when the curvature of a curved portion of an existing pipe is large, the width of a profile strip needs to be reduced so that the profile strip can conform to the shape of the curved portion. Disadvantageously, the use of a profile strip having a small width unavoidably leads to a reduction in workability.

An object of the present invention is to provide an existing pipe rehabilitating method for solving a problem with conventional existing pipe rehabilitating methods, and rehabilitating an existing pipe by causing a rehabilitating pipe that is formed of a profile strip to satisfactorily conform to a curved shape of an aging existing pipe having a straight pipe portion and a curved portion irrespective of the degree of the curvature of the curved portion, and in which the workability is not likely to decrease.

Means for Solving Problem

To achieve the object, the present invention provides an existing pipe rehabilitating method in which a profile strip for lining an existing pipe is shaped using a thermoplastic resin, joint portions are provided at both end portions in a width direction of the profile strip, the profile strip is inserted into the existing pipe and is helically wound in the existing pipe, the joint portions of adjacent windings of the profile strip are interlocked with each other, thereby forming a rehabilitating pipe, and the rehabilitating pipe is provided on an inner peripheral surface of a curved portion of the existing pipe. The method comprises the step of performing a heating process using a heating means with respect to the profile strip of the rehabilitating pipe provided at the curved portion of the existing pipe to deform the profile strip. The heating step causes the rehabilitating pipe to conform to a shape of the curved portion of the existing pipe.

According to the present invention, even when the curvature of the curved portion of the existing pipe is large, the rehabilitating pipe formed by helically winding the profile strip can be deformed to conform to the shape of the curved portion. Thereby, the existing pipe can be satisfactorily rehabilitated.

In the present invention, the profile strip has an expanding/contracting portion capable of expanding and contracting in a width direction of the profile strip. The expanding/contracting portion preferably has a predetermined curvature or a bendable portion. Thereby, when external force acts on the profile strip, the expanding/contracting portion accepts the external force and causes the profile strip to expand or contract in the width direction.

The heating means is provided at the expanding/contracting portion of the profile strip so as to heat the profile strip. The heating means may be caused to contact the profile strip so as to heat the profile strip. More preferably, the heating means may comprise means for transferring heat from a heat source.

Such a heating means can be used to easily deform the expanding/contracting portion of the profile strip, so that, if external force acts on the profile strip, deformation of the profile strip can be accepted, thereby making it possible to avoid damage. Also, the heating means contacts the profile strip to directly heat the expanding/contracting portion, so that heating can be performed with high thermal efficiency. Therefore, a rapid increase in temperature can be expected and the amount of supplied power can be suppressed.

Specifically, the heating means is preferably a flexible strip heater formed by connecting heat sources in parallel between flexible electrically-conductive wires and insulatingly covering the heat sources and the flexible electrically-conductive wires with a soft resin to integrally form one or more heater bodies, and covering the one or more heater bodies with a silicone rubber. The strip heater can transfer heat and conform to a shape of the expanding/contracting portion of the profile strip.

Such a heating means can be provided at the expanding/contracting portion of the profile strip to perform a heating process. Therefore, workability is increased and the heating process can be easily performed.

The heating means may heat the profile strip without contacting the profile strip. Thereby, the heating means can be easily positioned, installed, and the like. Therefore, workability is increased, and work can be performed while confirming a state of a heated portion with visual inspection during heating of the profile strip, thereby making it possible to correctly detecting and managing the amount of deformation of the profile strip.

Such a heating means may heat the profile strip by radiation or convection from the heat source. More specifically, it is preferable that the heating means utilizes hot air, steam, or flame to easily heat the profile strip without directly contacting it.

In the heating step of the present invention, a temperature at which the profile strip is heated is set to be higher than or equal to the glass transition temperature of a thermoplastic resin included in the profile strip and lower than or equal to the melting temperature of the thermoplastic resin. By managing the profile strip to have such a heating temperature, the profile strip can be easily deformed, and the profile strip can be prevented from being heated more than necessary and being therefore damaged.

Also, in the present invention, the heating step may be performed a plurality of times. By a plurality of heating steps, a portion of the profile strip that cannot be treated by a single heating process can be deformed, so that the rehabilitating pipe can be deformed into a shape that conforms to the curved portion of the existing pipe.

Also, in the present invention, the method may include, after the heating step, applying external force to an outer bent portion or an inner bent portion of the rehabilitating pipe provided at a curved portion of the existing pipe, wherein the outer bent portion or the inner bent portion is deformed to conform to a shape of the curved portion of the existing pipe.

By adding such a step of applying external force, the external force can act on the profile strip, so that the expanding/contracting portion of the profile strip can be expanded or contracted in the width direction, and therefore, the shape of the rehabilitating pipe can be deformed into a shape that conforms to the curved portion of the existing pipe. As a result, even when the curvature of the curved portion of the existing pipe is large, a rehabilitating pipe having a shape suited to the curved portion can be easily formed.

Effects of the Invention

According to the present invention, a rehabilitating pipe is formed of a profile strip into a shape that conforms to a curved portion of an aging existing pipe including a straight pipe portion and a curved portion. The rehabilitating pipe can satisfactorily conform to the curved portion irrespective of the degree of the curvature of the curved portion, thereby rehabilitating the existing pipe. Thus, an existing pipe rehabilitating method in which workability is not likely to decrease can be provided.

Figure 1:
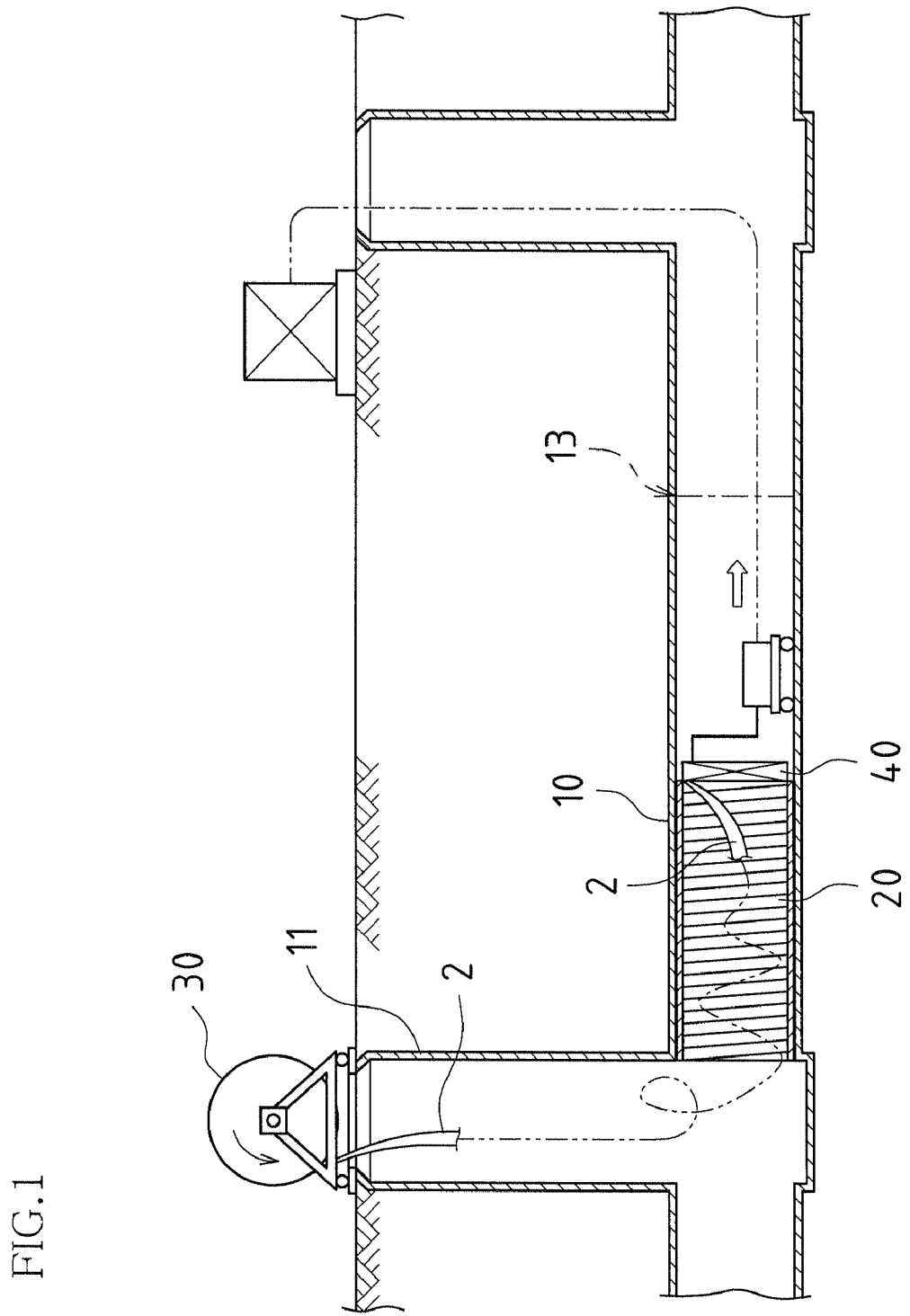
FIG. 1 is an explanatory diagram showing an exemplary existing pipe rehabilitating method according to the present invention as viewed from a cross-section taken along line A-A of FIG. 6.
Figure 2:
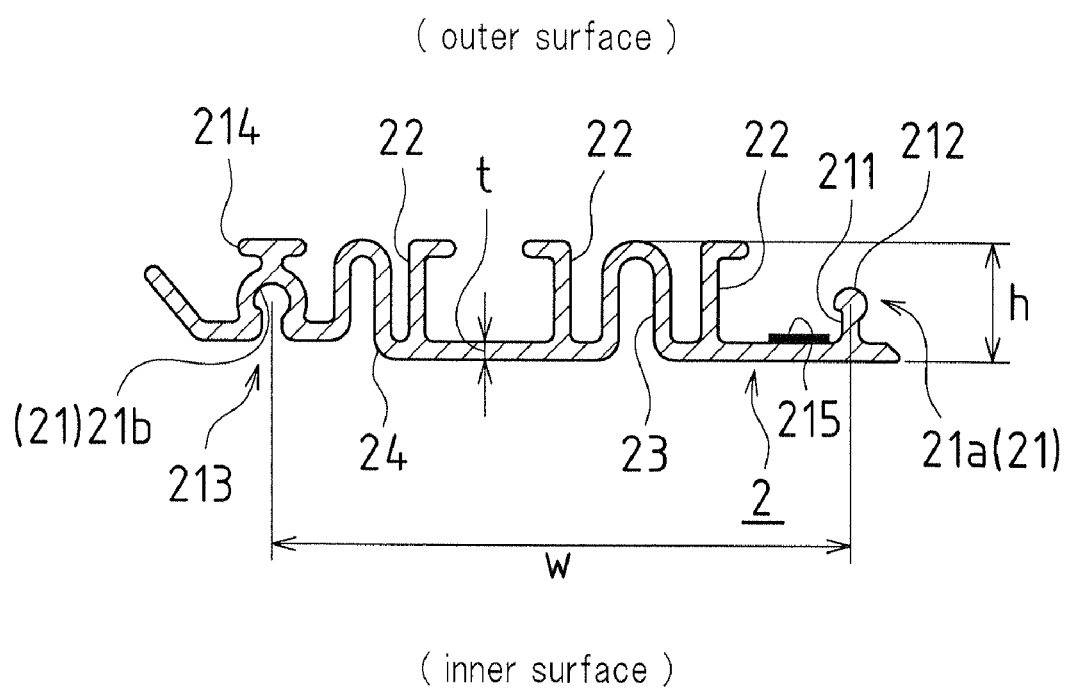
FIG. 2 is a cross-sectional view showing an exemplary profile strip used in the existing pipe rehabilitating method of the present invention.
Figure 3:
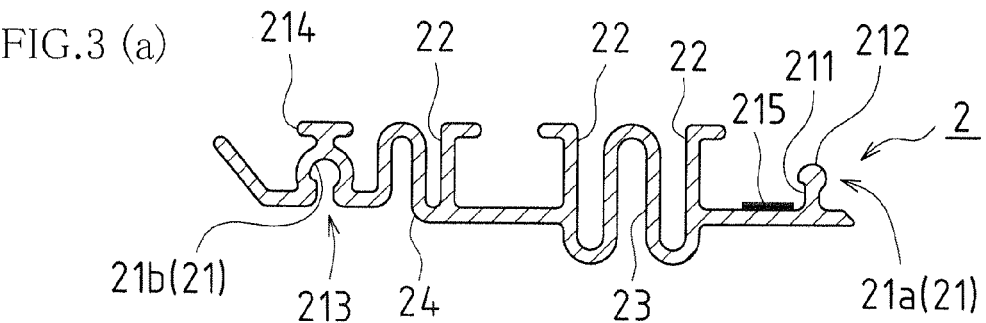
FIGS. 3(a) to 3(d) are cross-sectional views showing various forms of a profile strip used in the pipe rehabilitating method of the present invention.
Figure 3:
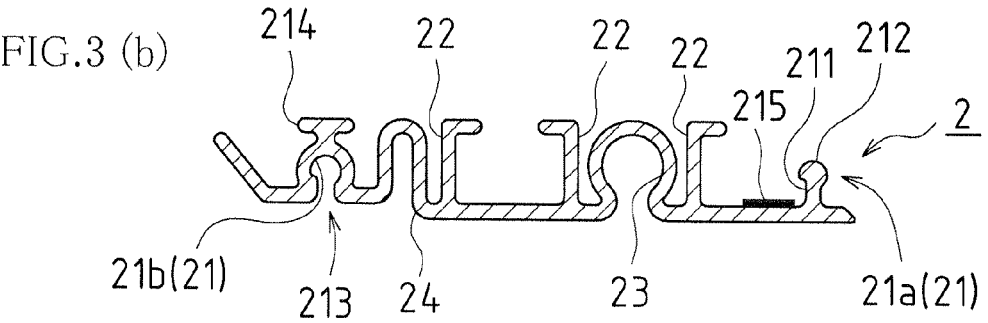
Figure 3:
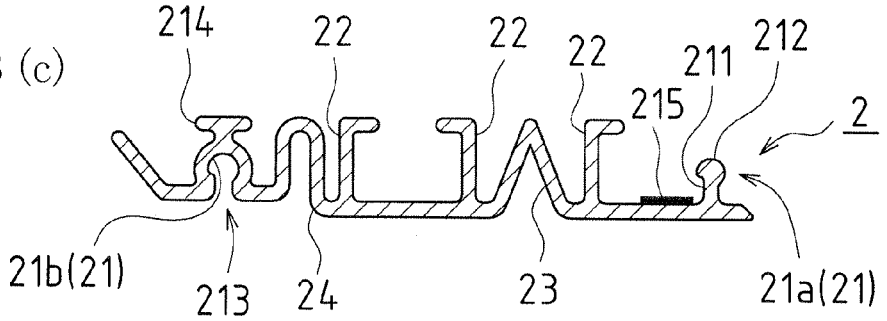
Figure 3:
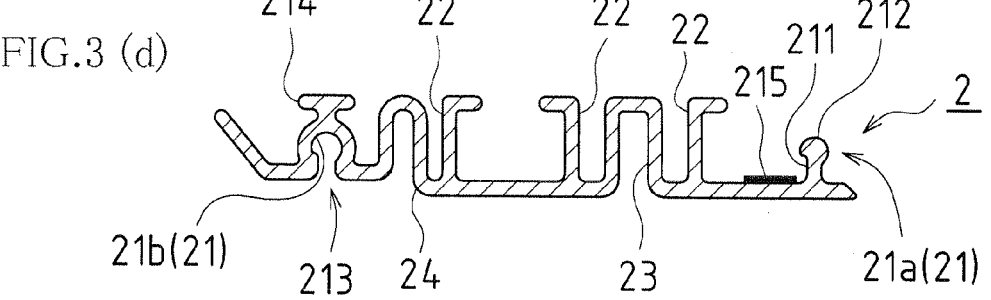

DESCRIPTION OF REFERENCE NUMERALS 10 existing pipe
11 manhole
12 straight pipe portion
13 curved portion
2 profile strip
21 joint portion
21a convex line
21b concave line
22 rib
23 expanding/contracting portion
24 step portion
20 rehabilitating pipe
30 drum
40 winding machine
41 frame
42 joining mechanism portion
43 roller
5 strip heater 51 heater body
52 silicone rubber
53 adhesive tape

DESCRIPTION OF THE INVENTION

Hereinafter, a best mode for carrying out an existing pipe rehabilitating method according to the present invention will be described with reference to the accompanying drawings.

FIG. 1 is an explanatory diagram showing an exemplary existing pipe rehabilitating method according to the present invention. Note that this figure shows a cross-sectional view of a pipe channel of an existing pipe 10, taken along line A-A of FIG. 6 described below.

The underground existing pipe 10 may have various cross-sectional shapes, such as a circular shape, a rectangular shape, a horseshoe shape, and the like. Although the rehabilitation method of the present invention is, for example, applied to the existing pipe 10 having a circular cross-sectional shape in the embodiment described below, the present invention is not limited to the cross-sectional shape of an existing pipe. The present invention can be similarly applied to an existing pipe having any shape, such as a rectangular shape, a horseshoe shape or the like.

As shown in FIG. 1, the existing pipe 10 is rehabilitated by forming a rehabilitating pipe 20 in the existing pipe 10, so that the inner peripheral surface of the aging the existing pipe 10 is rehabilitated by the rehabilitating pipe 20 additionally provided. The pipe channel of the existing pipe 10 illustrated is partially curved. The existing pipe 10 is bent in the vicinity of a portion indicated by reference numeral 13 in FIG. 1 in a plane in which the existing pipe 10 is laid. A drum 30 into which a profile strip 2 has been rolled is provided at an upper manhole 11 of the existing pipe 10 or in the existing pipe 10. The drum 30 is used to continuously feed the profile strip 2 to a movable winding machine 40 that is provided in the existing pipe 10. The winding machine 40 is driven by a drive power source that is provided in a downstream manhole. As described below, the winding machine 40 helically winds the profile strip 2 to form a pipe shape, resulting in the rehabilitating pipe 20.

Figure 4:
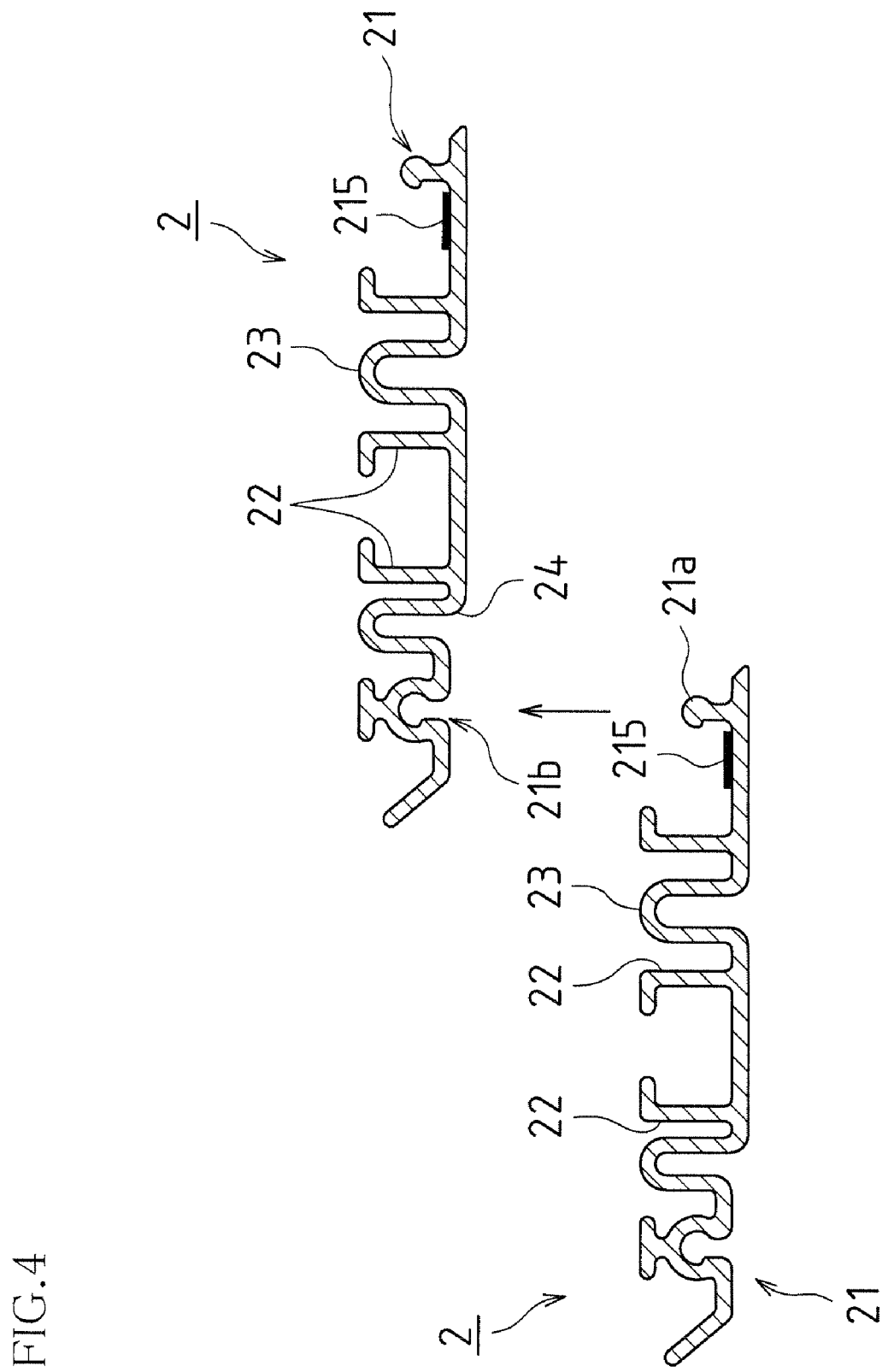
FIG. 4 is an explanatory diagram showing how joint portions of a profile strip used in the pipe rehabilitating method of the present invention are interlocked with each other.
Figure 5:
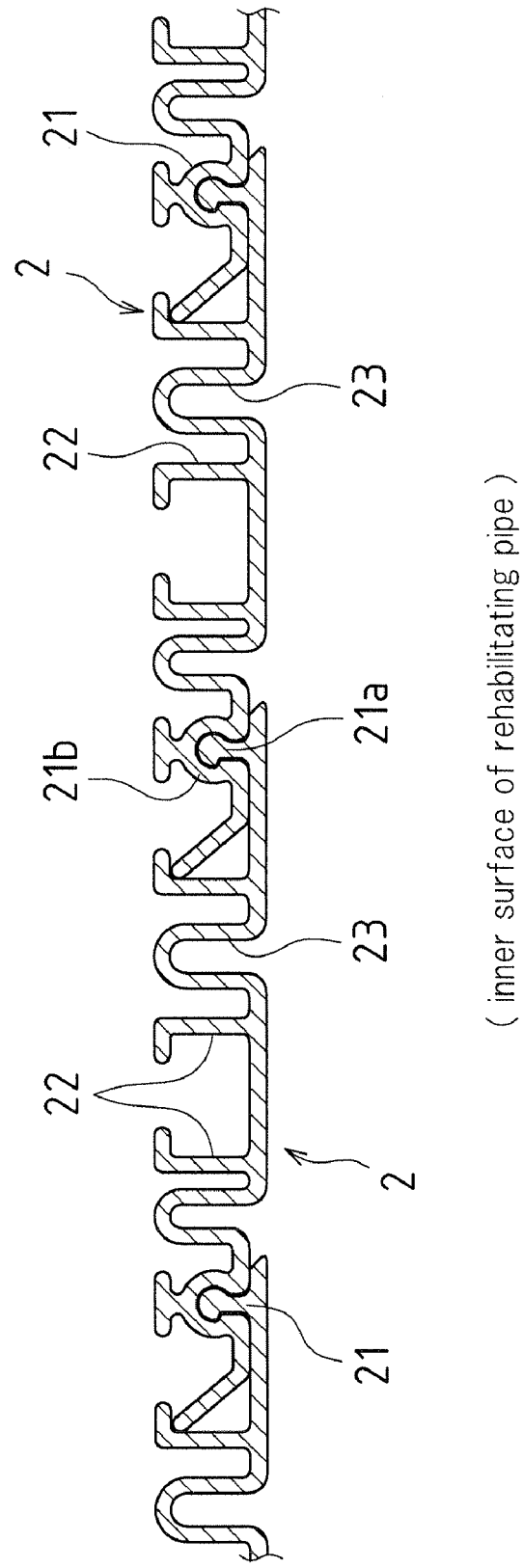
FIG. 5 is an explanatory diagram showing an interlocked state of a profile strip used in the pipe rehabilitating method of the present invention.
Figure 6:
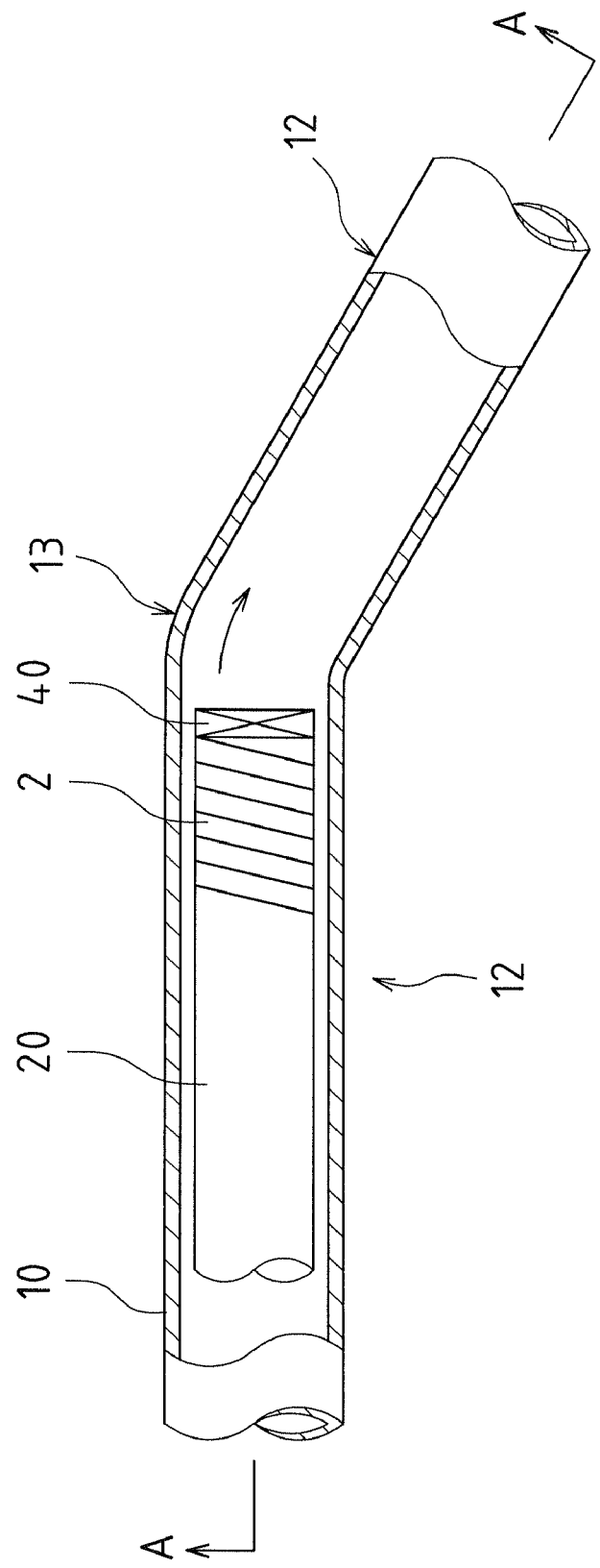
FIG. 6 is a diagram schematically showing a process of the existing pipe rehabilitating method of the present invention.
Figure 7:
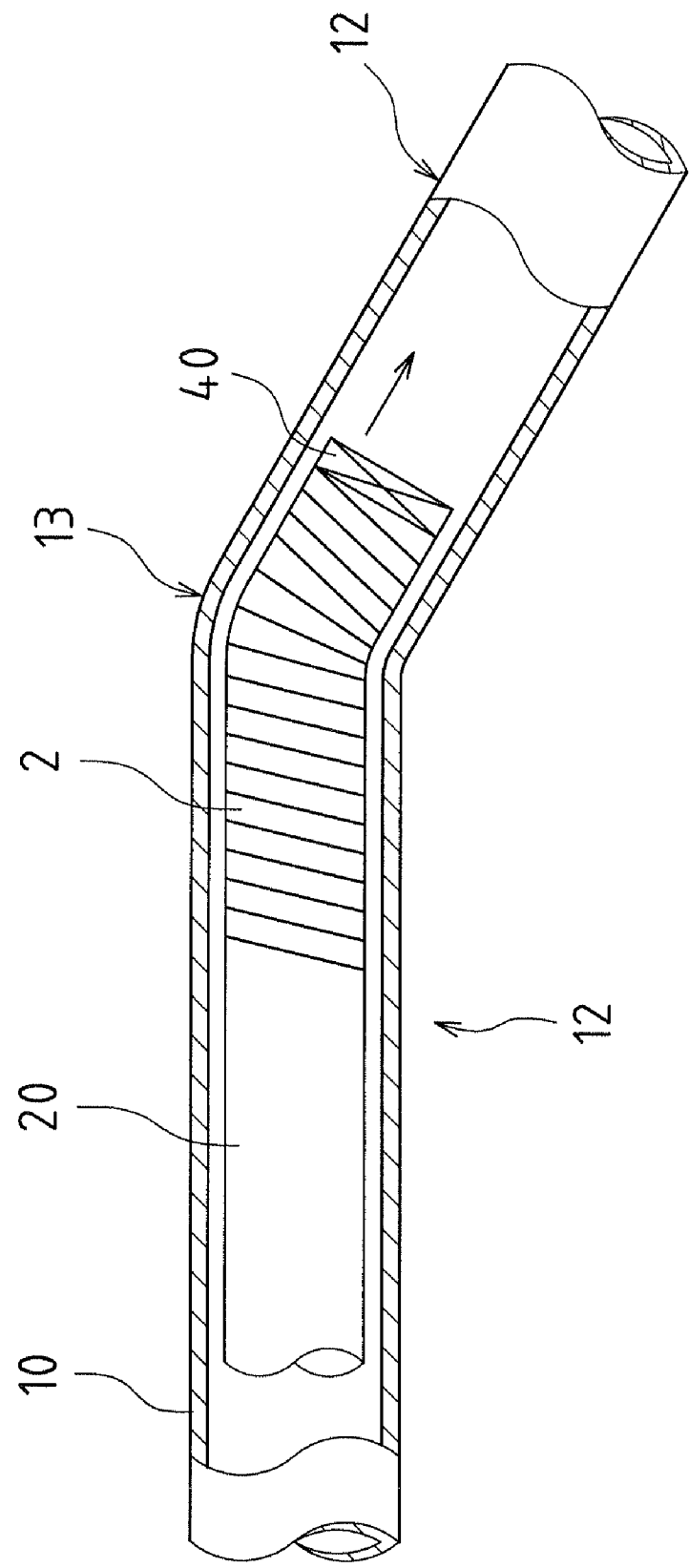
FIG. 7 is a diagram schematically showing a process of the existing pipe rehabilitating method of the present invention and the next step of FIG. 6.

FIG. 2 and FIGS. 3(a) to 3(d) are cross-sectional views illustrating a profile strip that is used in the existing pipe rehabilitating method of the present invention. FIG. 4 is an explanatory diagram showing how joint portions of the profile strip are interlocked with each other. FIG. 5 is an explanatory diagram showing an interlocked state of the profile strip. FIGS. 6 and 7 are diagrams schematically showing a process of the existing pipe rehabilitating method of the present invention and also providing a partially cutaway view of a horizontal cross-section (traverse section).

The profile strip 2 illustrated is particularly used at the curved portion 13 of the existing pipe 10. The profile strip 2 is an elongated strip formed of a flexible thermoplastic resin. The profile strip 2 has joint portions 21 at both ends in a width direction thereof. One of the joint portions 21 has a convex line 21a and the other joint portion 21 has a concave line 21b. The convex line 21a and the concave line 21b are each formed along a longitudinal direction of the profile strip 2, and are shaped so that they are interlocked and joined with each other.

The convex line 21a comprises a column portion 211 and a male interlocking portion 212 that is provided at a tip thereof and has substantially a circular cross-section. The concave line 21b comprises a female interlocking portion 213 having substantially a circular cross-section and a flange portion 214. A strip-shaped soft elastic member 215 made of an elastomer or the like that prevents adjacent windings of the profile strip 2 from slipping when they are joined with each other and attaches them tightly together, is provided in the vicinity of the convex line 21a. A plurality of ribs 22, . . . , and 22 are provided at substantially a middle portion in the width direction of the profile strip 2, standing upright along the longitudinal direction, thereby reinforcing the profile strip 2. The rib 22 has a bent tip portion that thus has an L-shaped (bent) cross-section.

The profile strip 2 has an inversed-U-shaped bent expanding/contracting portion 23. The expanding/contracting portion 23 is provided so that the profile strip 2 can expand and contract in its width direction, and has a predetermined curvature or a bendable portion. The expanding/contracting portion 23 may have any cross-sectional shape that has a curvature or a bendable portion, such as that shown in FIG. 2, or substantially a W curved shape, substantially a circular wave curved shape, substantially a triangular bent shape, or substantially a rectangular bent shape as shown in FIGS. 3(a) to 3(d).

The size of the expanding/contracting portion 23 is not particularly limited and may be appropriately selected, depending on the internal diameter and bending angle of the existing pipe 10 to be rehabilitated, the strength of the profile strip 2, or the like. For example, if the internal diameter and bending angle of the existing pipe 10 are 500 mm and 30°, respectively, then when the distance (w) between the joint portions 21 of the profile strip 2 is 80 mm, the expanding/contracting portion 23 preferably has a height (h) of about 16 mm, a thickness (t) of about 2.5 mm (similar to a thickness of the element), and a radius (R) of about 2.4 mm. The number of the expanding/contracting portions 23 provided in the profile strip 2 for such a curved portion may be one or more.

Also, a step portion 24 is provided in the vicinity of the female interlocking portion 213. Thereby, the female interlocking portion 213 is formed so that, as shown in FIGS. 4 and 5, when the convex line 21a of one of adjacent windings of the profile strip 2 that is helically wound is inserted into the concave line 21b of the other winding of the profile strip 2, the thickness of a portion where the convex line 21a and the concave line 21b are joined with each other becomes equal to the thickness of the other portions.

The material for the profile strip 2 is not particularly limited as long as it is a thermoplastic resin. The profile strip 2 is preferably integrally molded by extrusion molding or the like using a material, such as vinyl chloride resin, polyethylene, polypropylene, polycarbonate, polyester, so-called FRTP obtained by reinforcing these resins with glass fiber, or the like.

The profile strip 2 is not particularly limited as long as the joint portions 21 are formed on both end portions in the width direction thereof and the expanding/contracting portion 23 is formed. The profile strip 2 may be provided in an appropriate form, depending on the existing pipe 10 to be rehabilitated.

The profile strip 2 is helically wound using the winding machine 40, so that the convex line 21a and the concave line 21b of the joint portions 21 of the windings of the profile strip 2 that are arranged adjacent by this winding are interlocked with each other into a pipe shape. Thereby, as shown in FIG. 6, the rehabilitating pipe 20 is formed that has an external diameter that is slightly smaller than the internal diameter of the curved portion 13 of the existing pipe 10. Then, as shown in FIG. 7, the rehabilitating pipe 20 that is formed and derived by the winding machine 40 is extended forward while being rotated within the existing pipe 10.

Figure 8:
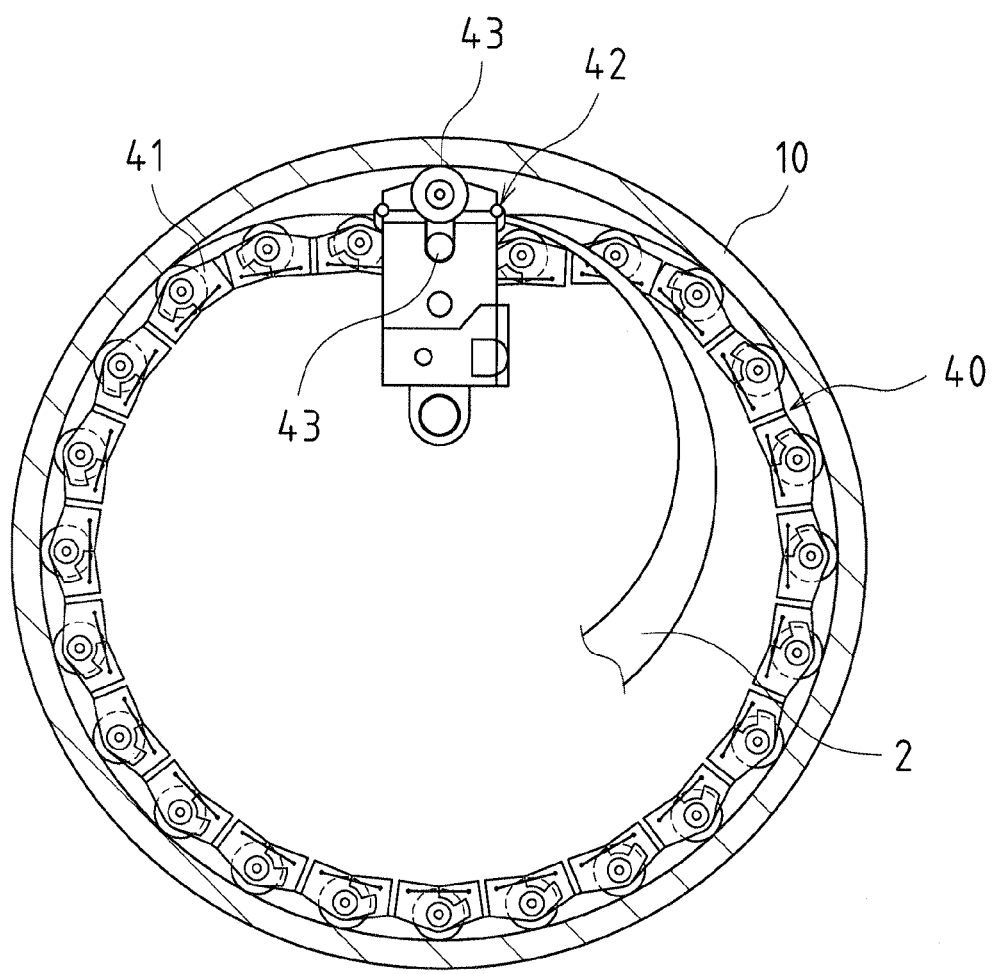
FIG. 8 is an explanatory diagram showing an exemplary winding machine used in the present invention, indicating a cross-section of an existing pipe as well.
Figure 9:
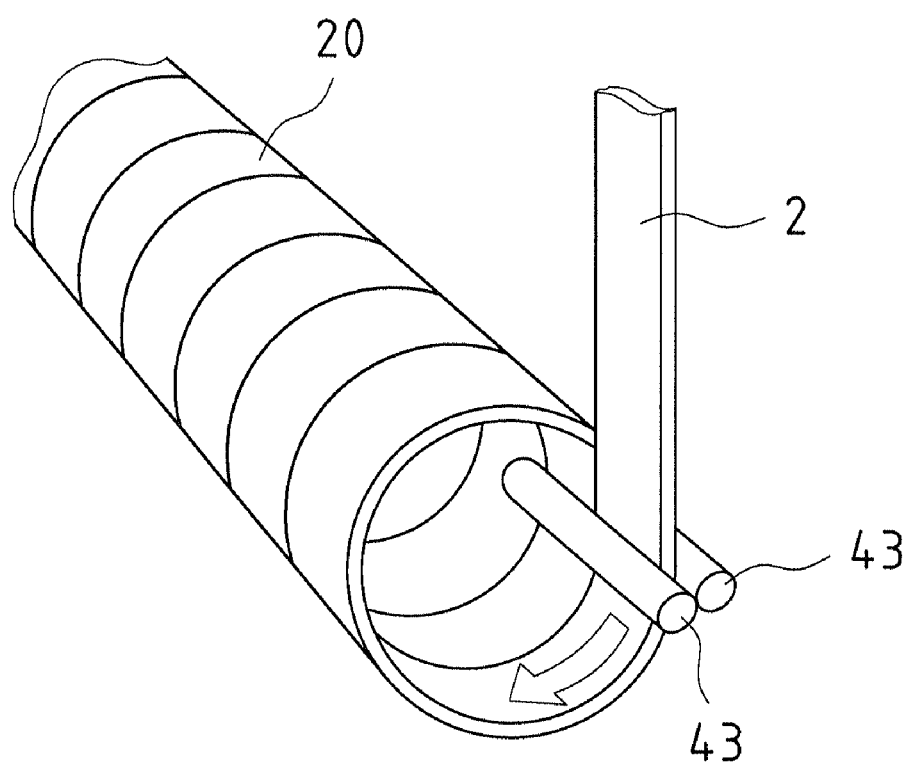
FIG. 9 is a diagram schematically showing a process of producing a pipe by a winding machine used in the present invention.

The winding machine 40 shown in FIG. 1 is a movable winding machine that is used to produce the rehabilitating pipe 20 having a circular cross-section. FIG. 8 is an explanatory diagram showing an exemplary winding machine, indicating a cross-section of the existing pipe 10 as well. FIG. 9 is a schematic diagram showing a process of producing a pipe by the winding machine 40.

As shown in FIG. 8, the winding machine 40 comprises a shaping frame 41 and a joining mechanism portion 42 that is provided at the shaping frame 41. The joining mechanism portion 42 comprises rollers 43 and 43 for sandwiching the profile strip 2 by pressing it from an outer surface and an inner surface thereof. By rotating the rollers 43 and 43, the whole winding machine 40 rotates and moves forward in the existing pipe 10 while helically winding the profile strip 2. In this case, as shown in FIG. 9, as the winding machine 40 moves forward, the rollers 43 and 43 of the winding machine 40 join the convex line 21a and the concave line 21b of adjacent windings of the profile strip 2.

Figure 10:
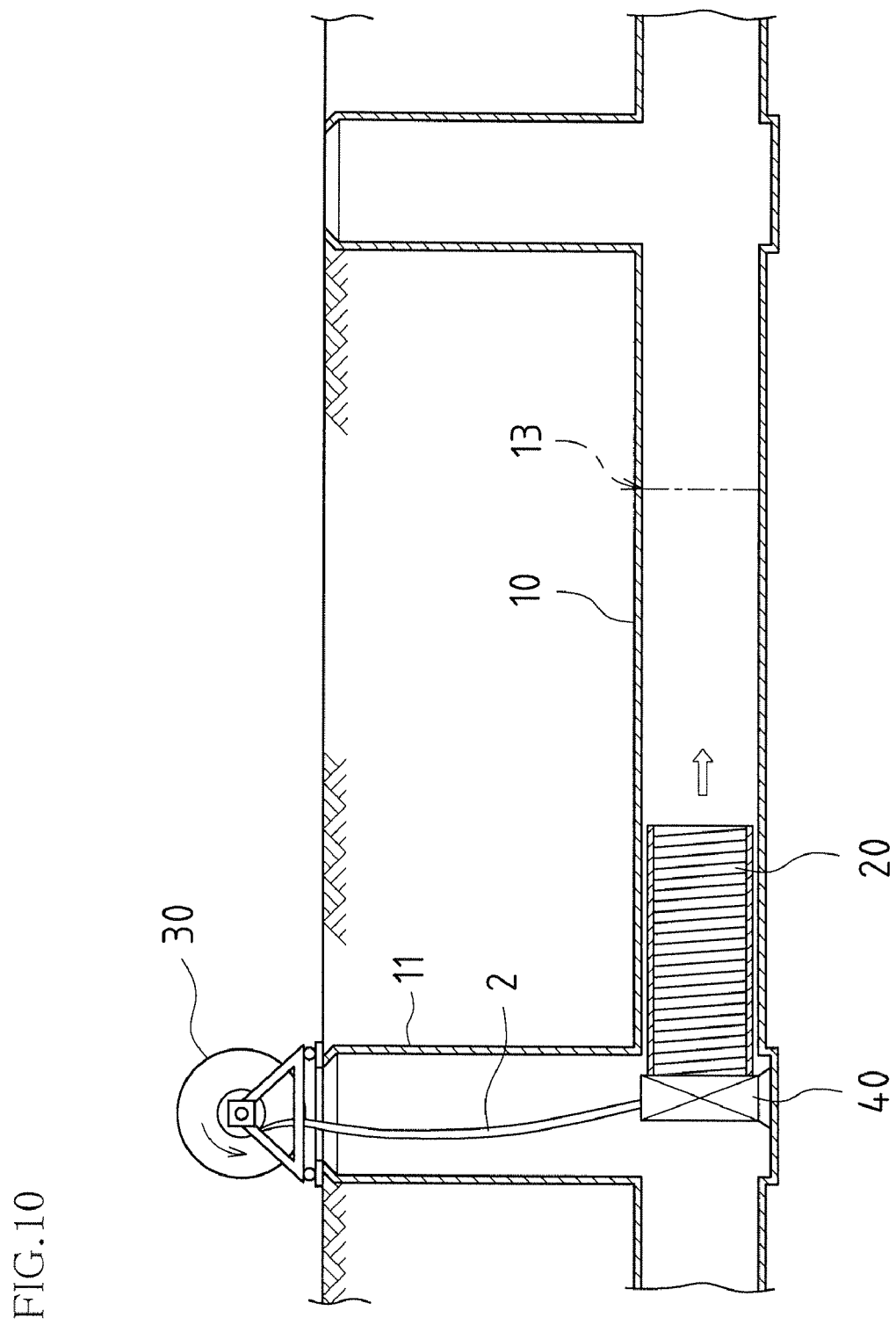
FIG. 10 is an explanatory diagram showing another exemplary existing pipe rehabilitating method according to the present invention.

FIG. 10 is an explanatory diagram showing another exemplary existing pipe rehabilitating method according to the present invention. In the present invention, the winding machine 40 may not be movable as described above, and may be fixed to an opening portion of the existing pipe 10 as shown in FIG. 10, for example. In this case, the profile strip 2 is continuously fed from the drum 30 into which the profile strip 2 has been rolled. The rehabilitating pipe 20 that is formed and derived by the winding machine 40 is directly introduced into the existing pipe 10 and is moved forward while being rotated in the existing pipe 10. Thereby, the rehabilitating pipe 20 is formed in the existing pipe 10.

When the curved portion 13 of the existing pipe 10 is rehabilitated, the winding machine 40 as described above is used to helically wind the profile strip 2 at least 15 turns, so that a rehabilitating pipe 20 having a pipe length of about 1.2-m is formed at the curved portion 13.

While producing the rehabilitating pipe 20, a heating means is used to heat the profile strip 2. The heating means may or may not be caused to contact the profile strip 2 for the purpose of heating.

Figure 11:
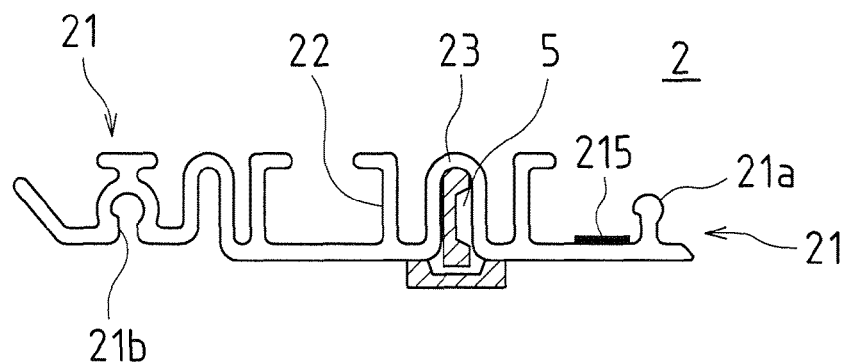
FIG. 11 is a cross-sectional view showing an exemplary heating step in the present invention.
Figure 12:
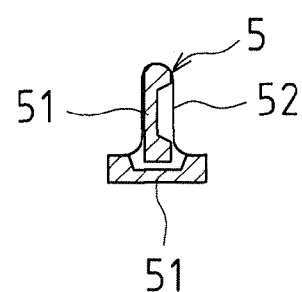
FIG. 12 is a cross-sectional view showing an exemplary heating means used in the heating step of FIG. 11.
Figure 13:
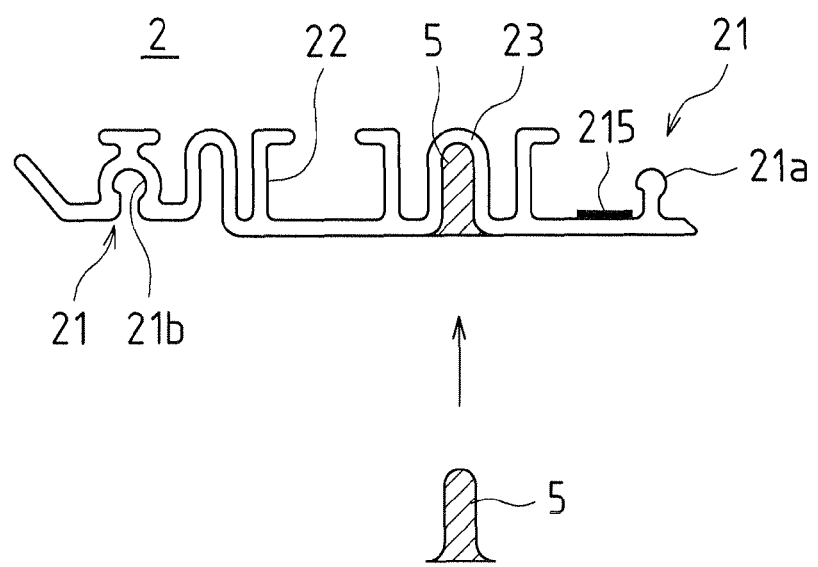
FIG. 13 is a cross-sectional view showing another exemplary heating step in the present invention.
Figure 14:
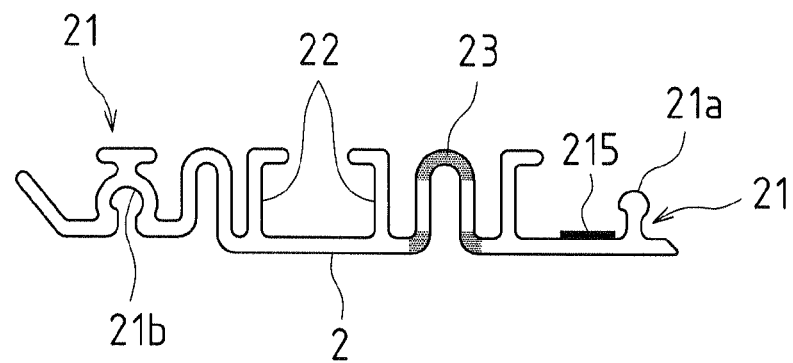
FIG. 14 is an explanatory diagram showing a portion to be heated of a profile strip by the heating step in the present invention.
Figure 15:
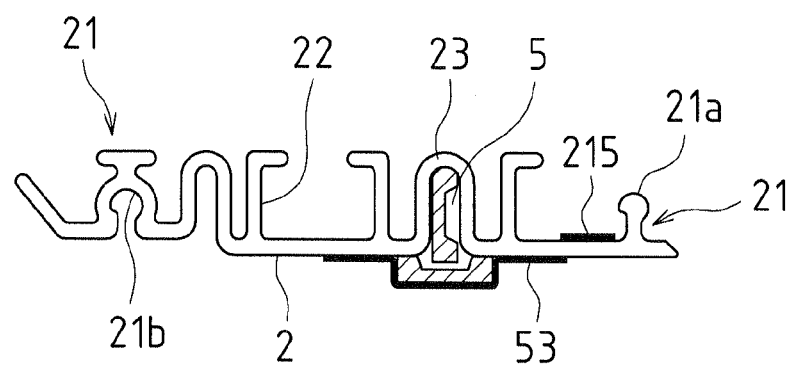
FIG. 15 is an explanatory diagram showing an exemplary protection of the heating means in the heating step in the present invention.

FIG. 11 is a cross-sectional view showing an exemplary heating step in the present invention. FIG. 12 is a cross-sectional view showing an exemplary heating means used in the heating step of FIG. 11. FIG. 13 is a cross-sectional view showing another exemplary heating step in the present invention. FIG. 14 is an explanatory diagram showing a portion to be heated of the profile strip by the heating step in the present invention. FIG. 15 is an explanatory diagram showing an exemplary protection of the heating means in the heating step in the present invention.

Note that, in each of FIGS. 11 to 15, hatching that indicates a cross-section is removed from elements, such as the profile strip 2, a silicone rubber 52, and the like, for the sake of easy understanding of the figure.

In examples shown in FIGS. 11 and 12, as the heating means, a flexible strip heater 5 for contacting and heating the profile strip 2 is employed. The strip heater 5 comprises means for transferring heat from an appropriate heat source. The strip heater 5 includes strip heater bodies 51. The heater body 51 is formed as follows. For example, a plurality of ceramic heating elements as a heat source are connected in parallel between flexible electrically-conductive wires. Using an extruder, these materials are insulatingly covered with a soft resin and are integrally formed into a band shape so that heat can be transferred.

Further, in the strip heater 5, the two heater bodies 51, which are arranged in substantially a T shape, are covered with the silicone rubber 52, so that the two heater bodies 51 and the silicone rubber 52 are integrally formed into an inverted-U-shaped outer shape that can conform to the inner surface shape of the expanding/contracting portion 23 of the profile strip 2. In this case, although each ceramic heating element of the strip heater 5 is not flexible, the electrically-conductive wires to which the ceramic heating elements are connected, the soft resin, and the silicone rubber 52 are flexible. Therefore, the strip heater 5 is flexible as a whole.

The strip heater 5 has a standard size. For example, the strip heater 5 preferably has a length of about 4 m per piece. A male plug may be coupled with one end of the strip heater 5 while a female plug may be coupled with the other end. With this structure, a number of the strip heaters 5 having the standard size can be linked into a required length.

The strip heater 5 as a heating means is inserted into and interlocked with the expanding/contracting portion 23 formed in the profile strip 2 from the inner peripheral surface side of the rehabilitating pipe 20. Therefore, the heating means may be any strip heater 5 that has a shape that can interlock with and conform to the inner surface of the expanding/contracting portion 23 as shown in FIG. 13.

A plurality of strip heaters 5 are preferably arranged as a whole, where a single strip heater 5 is provided per two adjacent windings of the profile strip 2. Alternatively, a single strip heater 5 may be provided per a plurality of adjacent windings of the profile strip 2, where the interval between each strip heater 5 includes one or more windings of the profile strip 2.

Thereby, the profile strip 2 is heated and deformed so that the shape of the rehabilitating pipe 20 conforms to the curved portion 13 of the existing pipe 10. In particular, a curved surface portion of the expanding/contracting portion 23 of the profile strip 2 shown in FIG. 14 is heated from the inner surface thereof so that the portion can be easily expanded or contracted.

A portion of the rehabilitating pipe 20 that is located at an outer curved portion of the existing pipe 10 is more intensely heated. In other words, the strip heaters 5 are preferably arranged in a well-balanced manner in a height direction at an outer bent portion of the produced rehabilitating pipe 20. An inner bent portion of the rehabilitating pipe 20 as well as its outer bent portion may be heated and deformed by providing the strip heater 5 or the like, depending on the shape of the curved portion 13 of the existing pipe 10.

FIG. 15 shows an exemplary protection of the heating means in the heating step. The strip heater 5 may not perform heating well if there is a gap between the strip heater 5 and the expanding/contracting portion 23 of the profile strip 2 or if the strip heater 5 floats over the expanding/contracting portion 23. Therefore, the strip heater 5 is preferably completely fitted into the expanding/contracting portion 23. Also, in order to prevent the strip heater 5 provided at the expanding/contracting portion 23 of the profile strip 2 from being peeled off, an adhesive tape 53 made of aluminum tape may be used to protect the strip heater 5 and the profile strip 2 as shown in FIG. 15.

The temperature at which the profile strip 2 is heated in the heating process is set within the range from the glass transition temperature to the melting temperature of the thermoplastic resin material for the profile strip 2. For example, when the rehabilitating pipe 20 is formed of the profile strip 2 made of a vinyl chloride resin, the heating temperature may be set to be about 90° C., which is higher than or equal to the glass transition temperature and is lower than or equal to the melting temperature. When the strip heater 5 described above is employed, it typically takes 3 to 5 minutes to reach the heating temperature of about 90° C. For this period of time, the winding machine 40 continues pipe production.

The heating process is preferably performed a plurality of times. In the first heating process, every other strip heater 5 is selected from a plurality of strip heaters 5 provided in the inner peripheral surface of the rehabilitating pipe 20 so that the profile strip 2 is partially heated. The selected strip heaters 5 are then simultaneously powered to start heating. In this case, heating is performed for five minutes and thirty seconds. This heating time is appropriately determined, depending on the material, thickness or the like of the profile strip 2. The heating time desirably does not exceed seven minutes so as not to damage the profile strip 2.

At the same time when the heating process is performed at the outer bent portion of the rehabilitating pipe 20, external force is applied to the profile strip 2 where the heated strip heaters 5 are located, thereby deforming the profile strip 2 into a shape that conforms to the curved portion 13 of the existing pipe 10.

Figure 16:
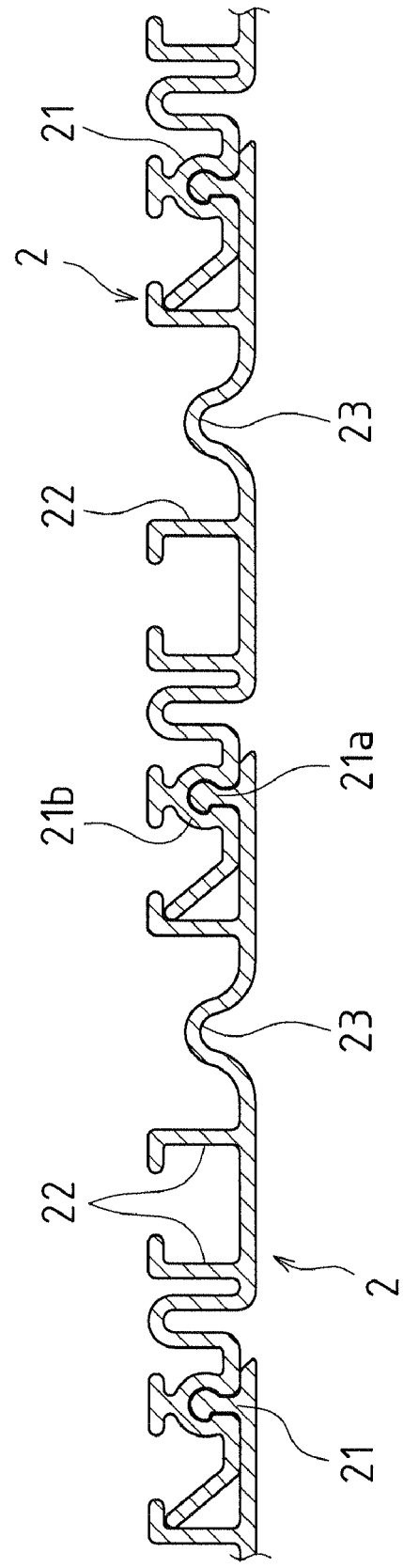
FIG. 16 is a cross-sectional view showing an exemplary profile strip deformed after the heating step in the present invention.

In the step of applying the external force, when the rehabilitating pipe 20 is deformed along an outer bent portion of the curved portion 13 of the existing pipe 10, tensile force is applied to the profile strip 2 by pulling in a traverse direction the profile strip 2 using, for example, a winch having a pulling lever, such as a chain lever hoist or the like, so that the expanding/contracting portion 23 of the profile strip 2 is expanded in the width direction as shown in FIG. 16. The profile strip 2 is expanded by about 20 mm in the width direction. Specifically, the profile strip 2 illustrated has a width (w) of 80 mm, so that the width (w) is expanded to 100 mm by applying external force. Note that, when the curved portion 13 has a large curvature, the shape of the expanding/contracting portion 23 of the profile strip 2 may be completely stretched to conform to the shape of the curved portion 13.

When an inner bent portion of the rehabilitating pipe 20 is also deformed along an inner bent portion of the curved portion 13 of the existing pipe 10 by heating, compressive force may be applied to the expanding/contracting portion 23 of the profile strip 2 using a chain block or the like, thereby contracting the expanding/contracting portion 23 in the width direction.

In this case, external force, such as tensile force or the like, should be applied to the profile strip 2 with careful observation so as to prevent the expanding/contracting portion 23 of the profile strip 2 from being stretched more than necessary and being therefore ruptured.

Next, the second heating process is performed. In the second heating process, the profile strip 2 is selectively heated at a position different from that of the first heating process by using a strip heater 5 that has not been used in the first heating process. Also, if sufficient expansion is not obtained at a portion by application of external force, a strip heater 5 is fitted into the expanding/contracting portion 23 at the portion so as to perform adjustment in the second heating process, thereby making up for the insufficient expansion or contraction.

As in the first heating process, the second heating process is desirably performed for five minutes and thirty seconds. All the selected strip heaters 5 are desirably simultaneously powered to start heating, and the heating time desirably does not exceed seven minutes.

While the second heating process is performed, external force is applied to the profile strip 2 so that the shape of the profile strip 2 is deformed to conform to the curved portion 13 of the existing pipe 10. Also in the step of applying the second external force, the profile strip 2 is pulled in the traverse direction so that the profile strip 2 located at the outer bent portion is stretched by about 20 mm in the width direction.

Note that, in the present invention, the heating means may not contact the profile strip 2. Any other heating means that can heat the profile strip 2, such as those employing radiation, convection or the like from a heat source, may be used. For example, a heating means that heats the profile strip 2 using hot air, steam, flame or the like provided from an appropriate heat source, may be used.

By the above-described steps, the rehabilitating pipe 20 is deformed into a shape that conforms to the curved portion 13 of the existing pipe 10. In particular, an outer bent portion of the rehabilitating pipe 20 is stretched and deformed along an outer side of the curved portion 13 of the existing pipe 10, i.e., is expanded in a pipe axis direction. Therefore, even when the curvature of the curved portion 13 is large, the shape of the rehabilitating pipe 20 can be easily caused to conform to the curvature of the curved portion 13 by expansion or contraction of the profile strip 2. Also, when compressive force is applied to an inner bent portion of the rehabilitating pipe 20 so that the inner curved portion is deformed, the inner curved portion is contracted and deformed along an inner side of the curved portion 13 of the existing pipe 10. Therefore, the rehabilitating pipe 20 can be caused to conform to the shape of the curved portion 13 of the existing pipe 10 to a further extent.

Figure 17:
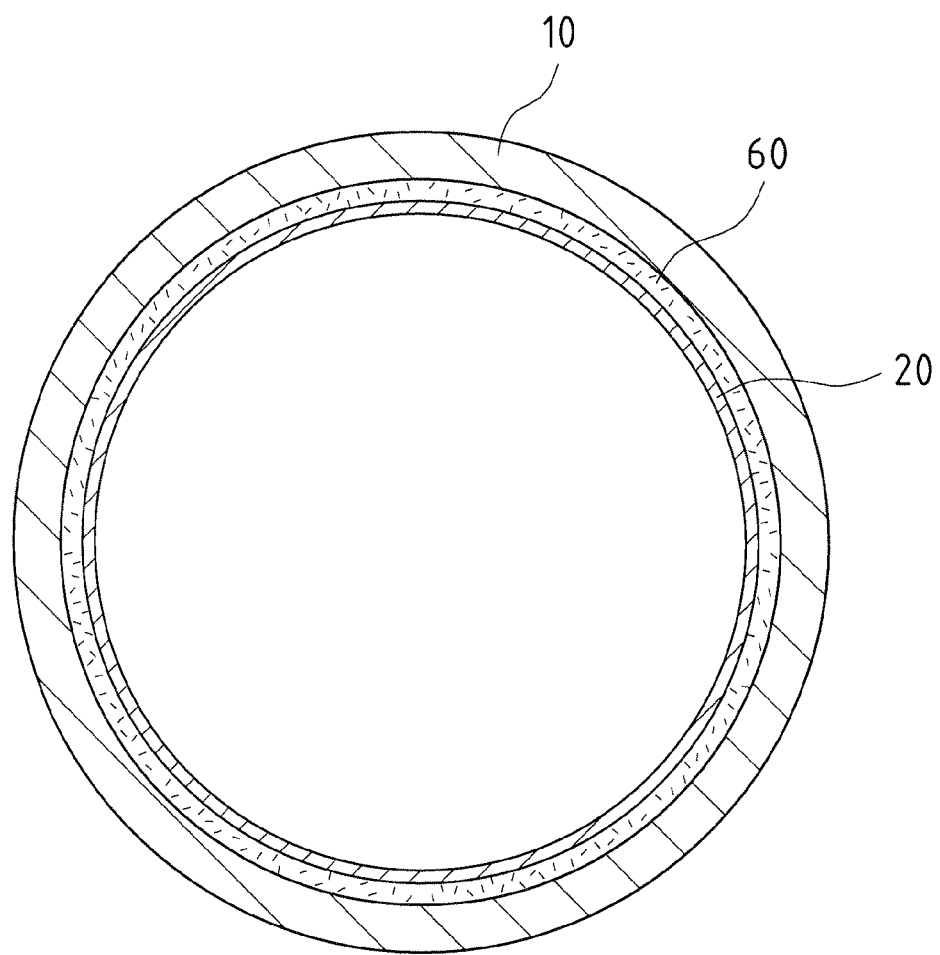
FIG. 17 is a cross-sectional view showing an exemplary existing pipe rehabilitated by the present invention.

FIG. 17 is a cross-sectional view showing the existing pipe 10 that has been rehabilitated by the present invention described above. As described above, the rehabilitating pipe 20 is curved into the shape of the curved portion 13 of the existing pipe 10, and thereafter, the profile strip 2 is continuously helically wound in the existing pipe 10 to produce the rehabilitating pipe 20, so that a straight pipe portion 12 is rehabilitated. Finally, a back-filling material 60 is injected into a gap between the inner surface and the existing pipe 10 and the outer surface of the rehabilitating pipe 20, so that the existing pipe 10 and the rehabilitating pipe 20 are integrated together. Thereby, as shown in FIG. 17, the existing pipe 10 is rehabilitated by the rehabilitating pipe 20. In addition, even when the curved portion 13 of the existing pipe 10 is bent in a depth direction, the present invention is applicable as described above.

Note that, in the present invention, the material and structure of the profile strip 2 are not limited to those as illustrated above. A resin that can change its shape back into its original shape upon heating may be employed. A structure that can be deformed upon heating by means of providing an electrically-heated wire and passing a current therethrough may be employed. A resin that contains iron powder may be employed to perform a heating process by means of an induced current or electromagnetic waves.

Figure 18:
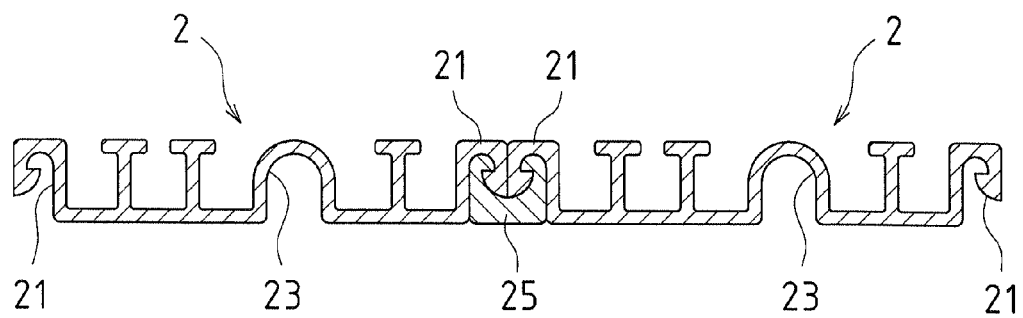
FIG. 18 is an explanatory diagram showing an interlocked state of a profile strip in another form used in the rehabilitating method of the present invention.

The shape of the profile strip 2 is also not limited to those described above. For example, as shown in FIG. 18, a strip-shaped linking member 25 may be used to link windings of the profile strip 2, where the strip-shaped linking member 25 is fitted into joint portions 21 and 21 of adjacent windings of the profile strip 2. Also in the case of the profile strip 2 having such a shape, the expanding/contracting portion 23 is deformed by a heating process so as to conform to the curved portion 13 of the existing pipe 10, thereby rehabilitating the existing pipe 10. In addition, even when the curved portion 13 of the existing pipe 10 is bent in a depth direction, the present invention is applicable as described above.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2006-290215 filed in Japan on Oct. 25, 2006, which is hereby incorporated by reference in its entirety. All documents cited herein are also specifically incorporated by reference in their entirety.

INDUSTRIAL APPLICABILITY

The present invention can be preferably applied so as to satisfactorily rehabilitate an aging existing pipe, depending on a curved shape of the existing pipe.

The invention claimed is:

1. A method for rehabilitating an existing pipe including a curved portion, comprising the steps of:

helically winding a profile strip in an existing pipe for lining the existing pipe so as to interlock end portions in a width direction of adjacent windings of the profile strip with each other, thereby forming a rehabilitating pipe; and deforming the profile strip by heating process using a heating means such that the rehabilitating pipe conforms to a shape of the curved portion of the existing pipe, wherein the profile strip is made of a thermoplastic resin, wherein joint portions are provided at both the end portions in the width direction of the profiled strip, wherein an expanding/contracting portion is disposed between the joint portions, the expanding/contracting portion being capable of expanding or contracting in the width direction of the profile strip by the heating process, and wherein the heating process is performed with respect to the expanding/contracting portion.

2. The existing pipe rehabilitating method according to claim 1, wherein the expanding/contracting portion has a predetermined curvature or a bendable portion.

3. The existing pipe rehabilitating method according to claim 1, wherein the heating means is provided at the expanding/contracting portion of the profile strip so as to heat the profile strip.

4. The existing pipe rehabilitating method according to claim 1, wherein the heating means is caused to contact the profile strip so as to heat the profile strip.

5. The existing pipe rehabilitating method according to claim 4, wherein the heating means comprises means for transferring heat from a heat source.

6. The existing pipe rehabilitating method according to claim 5, wherein the heating means is a flexible strip heater formed by connecting heat sources in parallel between flexible electrically-conductive wires and insulatingly covering the heat sources and the flexible electrically-conductive wires with a soft resin to integrally form one or more heater bodies, and covering the one or more heater bodies with a silicone rubber, wherein the strip heater can transfer heat and conform to a shape of the expanding/contracting portion of the profile strip.

7. The existing pipe rehabilitating method according to claim 1, wherein the heating means can heat the profile strip without contacting the profile strip.

8. The existing pipe rehabilitating method according to claim 7, wherein the heating means can heat the profile strip by radiation or convection from the heat source.

9. The existing pipe rehabilitating method according to claim 8, wherein the heating means is hot air, steam, or flame.

10. The existing pipe rehabilitating method according to claim 1, wherein in the heating step, a temperature at which the profile strip is heated is set to be higher than or equal to a glass transition temperature of a thermoplastic resin included in the profile strip and lower than or equal to a melting temperature of the thermoplastic resin.

11. The existing pipe rehabilitating method according to claim 1, wherein the heating step is performed a plurality of times.

12. The existing pipe rehabilitating method according to claim 1, wherein the method includes, after the heating step, applying external force to an outer bent portion or an inner bent portion of the rehabilitating pipe provided at a curved portion of the existing pipe, wherein the outer bent portion or the inner bent portion is deformed to conform to a shape of the curved portion of the existing pipe.

* * * * *